United States Patent
Hao et al.

(10) Patent No.: US 11,481,975 B2
(45) Date of Patent: Oct. 25, 2022

(54) IMAGE PROCESSING METHOD AND APPARATUS, ELECTRONIC DEVICE, AND COMPUTER-READABLE STORAGE MEDIUM

(71) Applicant: BEIJING SENSETIME TECHNOLOGY DEVELOPMENT CO., LTD., Beijing (CN)

(72) Inventors: Yuanzhen Hao, Beijing (CN); Mingyang Huang, Beijing (CN); Jianping Shi, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 3 days.

(21) Appl. No.: 17/073,778

(22) Filed: Oct. 19, 2020

(65) Prior Publication Data
US 2021/0035362 A1 Feb. 4, 2021

Related U.S. Application Data

(63) Continuation of application No. PCT/CN2019/093551, filed on Jun. 28, 2019.

(30) Foreign Application Priority Data

Jul. 4, 2018 (CN) .......................... 201810724309.3

(51) Int. Cl.
*G06T 7/70* (2017.01)
*G06T 19/20* (2011.01)
(Continued)

(52) U.S. Cl.
CPC .............. *G06T 17/205* (2013.01); *G06T 7/70* (2017.01); *G06T 19/20* (2013.01); *G06V 40/161* (2022.01);
(Continued)

(58) Field of Classification Search
CPC ......... G06T 17/205; G06T 7/70; G06T 19/20; G06K 9/00228; G06K 9/00268
(Continued)

(56) References Cited

U.S. PATENT DOCUMENTS

2012/0173521 A1   7/2012  Lam
2016/0275659 A1*  9/2016  Nimura .................. G06T 17/20
(Continued)

FOREIGN PATENT DOCUMENTS

CN    103605975 A    2/2014
CN    103824253 A    5/2014
(Continued)

OTHER PUBLICATIONS

International Search Report in the international application No. PCT/CN2019/093551, dated Sep. 30, 2019, 2 pgs.
(Continued)

*Primary Examiner* — Hai Tao Sun
(74) *Attorney, Agent, or Firm* — Cooper Legal Group, LLC

(57) ABSTRACT

An image processing method and apparatus, and a computer-readable storage medium are provided. The method includes: determining a first region matching a target object in a first image; determining a deformation parameter based on a preset deformation effect, the deformation parameter being used for determining a position deviation, generated based on the preset deformation effect, of each pixel point of the target object; and performing deformation processing on the target object in the first image based on the deformation parameter to obtain a second image.

17 Claims, 6 Drawing Sheets

(51) Int. Cl.
*G06T 17/20* (2006.01)
*G06V 40/16* (2022.01)

(52) U.S. Cl.
CPC .. *G06V 40/168* (2022.01); *G06T 2207/30201* (2013.01); *G06T 2219/2004* (2013.01)

(58) Field of Classification Search
USPC .......................................................... 345/419
See application file for complete search history.

(56) References Cited

U.S. PATENT DOCUMENTS

2017/0236250 A1* 8/2017 Kim ................... G06K 9/00288
382/190
2018/0032797 A1 2/2018 Lee et al.

FOREIGN PATENT DOCUMENTS

| CN | 104063842 | A | * | 9/2014 | ............... G06T 3/00 |
|----|-----------|---|---|--------|----|
| CN | 104063842 | A |   | 9/2014 |    |
| CN | 104063890 | A |   | 9/2014 |    |
| CN | 106548117 | A |   | 3/2017 |    |
| CN | 109087238 | A |   | 12/2018 |   |
| JP | 2004234333 | A |  | 8/2004 |    |

OTHER PUBLICATIONS

English translation of the Written Opinion of the International Search Authority in the international application No. PCT/CN2019/093551, dated Sep. 30, 2019, 6 pgs.
First Office Action of the Chinese application No. 201810724309.3, dated Dec. 18, 2019, 19 pgs.
Second Office Action of the Chinese application No. 201810724309.3, dated Jul. 13, 2020, 19 pgs.
Third Office Action of the Chinese application No. 201810724309.3, dated Dec. 22, 2020 6 pgs.
"Image Deformation Using Moving Least Squares"; Jul. 2006, Scott Schaefer, Travis McPhail and Joe Warren; ACM Journal, ACM Transactions on Graphics, vol. 25, No. 3, 8 pgs.
"Principal Warps: Thin-Plate Splines and the Decomposition of Deformations"; Jun. 1989; Fred L. Bookstein, IEEE Transactions on Pattern Analysis and Machine Intelligence, vol. 11, No. 6, 19 pgs.
"Bézier Surfaces: de Casteijau's Algorithm", Feb. 2021, reprinted from the internet at: https://pages.mtu.edu/~shene/COURSES/CS3621/NOTES/surface/bezier-de-casteljau.html, 3 pgs.
"Numerical Method-Thin-Plate Spline", Apr. 2017, reprinted from the Internet at: https://blog.csdn.net/victoriaw/article/details/70161180, 8 pgs.
First Office Action of the Japanese application No. 2020-558500, dated Nov. 24, 2021, 6 pgs.

* cited by examiner

IMAGE PROCESSING METHOD AND APPARATUS, ELECTRONIC DEVICE, AND COMPUTER-READABLE STORAGE MEDIUM

CROSS REFERENCE TO RELATED APPLICATIONS

The present application is a continuation of International Patent Application No. PCT/CN2019/093551, filed on Jun. 28, 2019, which claims priority to Chinese Patent Application No. 201810724309.3, filed on Jul. 4, 2018. The disclosures of International Patent Application No. PCT/CN2019/093551 and Chinese Patent Application No. 201810724309.3 are hereby incorporated by reference in their entireties.

BACKGROUND

At present, intelligent devices such as mobile phones and cameras are all equipped with image deformation functions to satisfy the user's entertainment needs. In the prior art, different deformation effects of an image are achieved mostly by adding pictures with preset effects to the image, or the shape of the image is changed by dragging the image to achieve a deformation effect.

SUMMARY

The present disclosure relates to the field of image processing, and in particular, to an image processing method and apparatus, an electronic device, and a computer-readable storage medium. In view of the above, the present disclosure provides the technical solutions for image processing.

According to a first aspect of the present disclosure, provided is an image processing method, including: determining a first region matching a target object in a first image; determining a deformation parameter based on a preset deformation effect, the deformation parameter being used for determining a position deviation, generated based on the preset deformation effect, for each pixel point of the target object; and performing deformation processing on the target object in the first image based on the deformation parameter to obtain a second image.

According to a second aspect of the embodiments of the present disclosure, provided is an image processing apparatus, including: a processor; and a memory configured to store instructions executable by the processor; where the processor is configured to execute the image processing method according to the first aspect.

According to a third aspect of the embodiments of the present disclosure, provided is a computer-readable storage medium having computer program instructions stored thereon, where the computer program instructions, when being executed by a processor, cause the process to implement the image processing method according to the first aspect.

The other features and aspects of the present disclosure can be described more clearly according to the detailed descriptions of the exemplary embodiments in the accompanying drawings.

BRIEF DESCRIPTION OF THE DRAWINGS

The accompanying drawings included in the description and constituting a part of the description illustrate the exemplary embodiments, features, and aspects of the present disclosure together with the description, and are used for explaining the principles of the present disclosure.

DETAILED DESCRIPTION

The various exemplary embodiments, features, and aspects of the present disclosure are described below in detail with reference to the accompanying drawings. The same signs in the accompanying drawings represent elements having the same or similar functions. Although the various aspects of the embodiments are illustrated in the accompanying drawings, unless stated particularly, it is not required to draw the accompanying drawings in proportion.

The special word "exemplary" here means "used as examples, embodiments, or descriptions". Any "exemplary" embodiment given here is not necessarily construed as being superior to or better than other embodiments.

In addition, numerous details are given in the following detailed description for the purpose of better explaining the present disclosure. A person skilled in the art should understand that the present disclosure may also be implemented without some specific details. In some examples, methods, means, elements, and circuits well known to a person skilled in the art are not described in detail so as to highlight the subject matter of the present disclosure.

Figure 1:
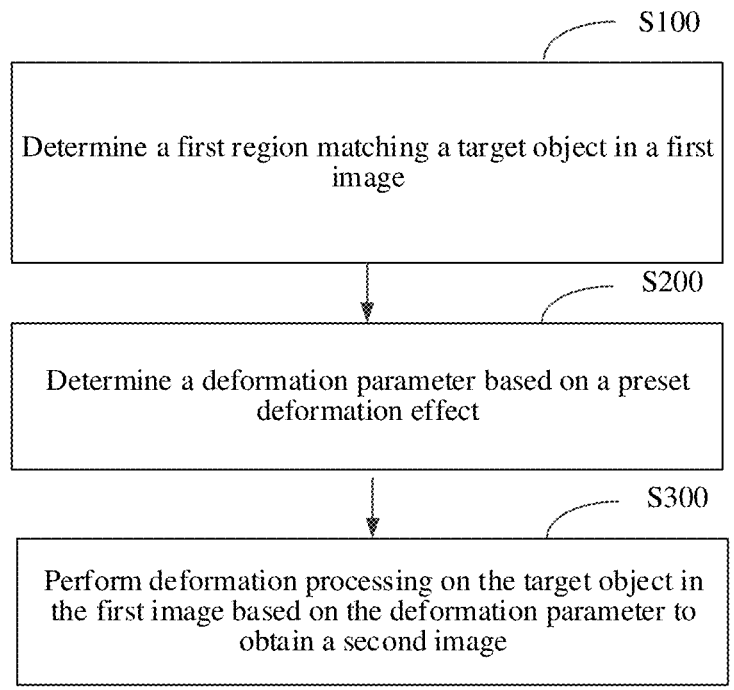
FIG. 1 illustrates a flowchart of an image processing method according to embodiments of the present disclosure.

FIG. 1 illustrates a flowchart of an image processing method according to embodiments of the present disclosure. The image processing method of the embodiments of the present disclosure may be applied to electronic devices having an image processing function, such as mobile phones, cameras, vidicons, PADs, and computer devices, which is not limited in the present disclosure.

As shown in FIG. 1, the image processing method according to the embodiments of the present disclosure includes the following steps.

At S100, a first region matching a target object is determined in a first image.

According to the image processing method provided by the embodiments of the present disclosure, deformation processing may be performed on an image to obtain an image with a corresponding deformation effect. The first image may be an image captured by an electronic device, an image received by means of communication connection with another electronic device, or an image stored in the electronic device, which is not limited in the embodiments of the present disclosure.

In addition, the target object is the part of the first image that needs deformation processing, e.g., a face, an animal, a plant, a scene, and other objects, or an image region object optionally selected by a user, or the entire image, which is likewise not limited in the embodiments of the present disclosure. After the first image is obtained, it is possible to determine the target object in the first image that needs deformation processing. The approach of determining the target object may include: determining the target object according to the current photographing mode of the electronic device; or receiving selection information input by the user and determining the target object based on the selection information; or determining the target object according to feature information in the first image. In other embodiments of the present disclosure, the target object may also be determined in other approaches.

In the embodiments of the present disclosure, when a photographing operation is executed, deformation processing may be performed on the obtained image, where the target object requiring deformation processing may be determined according to the current photographing mode. The photographing mode in the implementation of the present disclosure may include a portrait mode and a scene mode, or may also include other modes. When the current photographing mode of the electronic device is the portrait mode, the face in the image may be determined as the target object. Alternatively, when the current photographing mode of the electronic device is the scene mode, the scene in the image may be taken as the target object. That is, in different photographing modes, the corresponding target object may be determined to perform deformation processing of the corresponding target object without user operation, and it is simple and convenient. The above is only an embodiment to illustrate that the target object may be determined according to the photographing mode, which is not limited in the embodiments of the present disclosure.

In addition, in the embodiments of the present disclosure, the target object may also be determined according to selection information input by a user. When deformation processing of the first image is performed, a selection operation of the user on the first image may be received, that is, the user may perform a selection operation on the first image by means of a touch operation or a bounding operation, and the image information selected by the selection operation is the selection information. Alternatively, the user may also select the category of the target object to be determined from an option list of target objects. For example, the option list may include options such as a face, an animal, a plant, and a scene. The target object in the selected image may be determined by receiving selection information about the foregoing options.

In this way, the target object in the first image may be obtained, and then the first region corresponding to the target object may be determined based on the target object. The size of the first region in the embodiments of the present disclosure matches the size of the target object, the position of the first region also matches the position of the target object, and the deformation of the target object may be achieved by performing deformation processing on each pixel point in the first region.

In the embodiments of the present disclosure, determining the first region matching the target object in the first image includes forming a first mesh corresponding to the target object, the first mesh matching the first region. That is, in the embodiments of the present disclosure, the determined target object may be used for obtaining a corresponding first mesh, and the position and size of the first mesh match the target object, that is, the position of the first mesh is the first region, or the first region is represented in the form of a first mesh. The first mesh may include a plurality of sub-meshes, each corresponding to at least one pixel point. In the embodiments of the present disclosure, it is convenient to analyze the position, gray scale, and other features of each pixel point in the mesh by forming the first mesh. In the following embodiments, the first mesh is taken as an example for description.

At S200, a deformation parameter is determined based on a preset deformation effect, the deformation parameter being used for determining a position deviation, generated based on the preset deformation effect, for each pixel point of the target object.

In the embodiments of the present disclosure, the corresponding deformation parameter may be determined according to the preset deformation effect. For example, the deformation parameter may be determined by means of the deformation effect corresponding to an existing deformation image. Alternatively, the deformation parameter may be determined by directly operating the first region (first mesh) and obtaining the deformation effect of the first region. Furthermore, a deformation operation may be performed on each pixel point in the first region by means of a preset algorithm based on the deformation parameter. The deformation parameter may be used for determining the position deviation, generated based on the preset deformation effect, of each pixel point of the target object, that is, the deformation parameter may include or determine the position of each pixel point of the target object after deformation, and a second image may be formed correspondingly by means of the position. The deformation parameter in the embodiments of the present disclosure may be a deformed pixel matrix, and each parameter in the deformed pixel matrix is used for determining the position deviation, generated based on the preset deformation effect, of the corresponding pixel point of the target object. The dimension (size) of the deformed pixel matrix may correspond to the first mesh, that is, parameter values in the deformed pixel matrix have one-to-one correspondence to pixel points in the first mesh. The foregoing parameter values may be used for determining the position offset of the corresponding pixel points. The parameters in the deformed pixel matrix may be used for determining the position variation of each pixel point during deformation processing, i.e., the foregoing position deviation. The step of determining the deformation parameter based on the preset deformation effect in the embodiments of the present disclosure includes determining the deformation parameter based on the preset deformation effect by using a preset algorithm. The preset algorithm may include a Bezier surface algorithm. For example, the deformation parameter or the deformed pixel matrix may include the position offset of each pixel point in the preset deformation effect. The position offset includes not only the position offset value but also the offset direction, so that it is convenient to determine the position of each pixel point of the target image after deformation. Alternatively, the deformed pixel matrix may include the original position coordinates, before deformation, of a pixel point at the current coordinates in the preset deformation effect, so that the foregoing position deviation may be determined based on the deviation between the original position coordinates and the current coordinates.

At S300, deformation processing is performed on the target object in the first image based on the deformation parameter to obtain a second image.

As described above, for example, the deformation parameter of the deformed pixel matrix may be used for determining the position deviation of the corresponding pixel point when the deformation processing is performed, and therefore, the position of each pixel point of the target object after deformation may be determined according to the position deviation to perform a deformation operation, so as to obtain the second image.

In the embodiments of the present disclosure, the pixels may be estimated by means of a bilinear interpolation algorithm, so that the deformed image is smoother.

According to the foregoing configuration, deformation processing from the first image to the second image is completed. In the embodiments of the present disclosure, deformation processing may be performed on the first image according to the deformation parameter corresponding to the preset deformation effect, and thus, the embodiments of the present disclosure have a more flexible and convenient deformation effect, and are also applicable to various images, and the user experience is better.

The embodiments of the present disclosure are described in detail below. In step S100, the first region matching the target object may be determined according to the target object. Determining the first region matching the target object in the first image may include:

determining positions of feature points of the target object in the first image; and determining the first region based on relative positions between the feature points.

Figure 6:
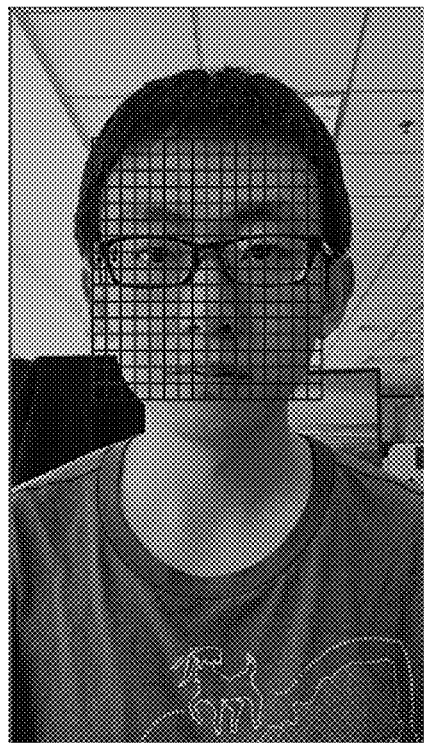
FIG. 6 illustrates a flowchart of determining a first region in an image processing method according to embodiments of the present disclosure.

FIG. 6 illustrates a flowchart of determining a first region in an image processing method according to embodiments of the present disclosure. In the embodiments of the present disclosure, after the target object requiring deformation processing in the first image is determined, the feature points of the target object may be recognized, and the first mesh may be determined based on the positions of the feature points. Edge feature points of the target object may be obtained. For example, the edge feature points of the target object are extracted by means of an image edge detection algorithm, and the first mesh is determined by connecting the edge feature points. The image edge detection algorithm may include a Canny operator edge detection algorithm or Sobel operator edge detection. In other embodiments, the edge feature points may also be determined by other edge detection approaches. The contour of the target object may be determined based on the edge feature points, and the first region may correspond to the contour, or may be a square mesh generated based on the contour. That is, the outer border of the first region may be determined by the upper, lower, left, and right edges of the contour, that is, the height of the first region may be determined according to the feature point on the uppermost edge and the feature point on the lowermost edge, and the width of the first region is determined according to the distance between the feature point on the leftmost edge and the feature point on the rightmost edge, so as to determine the first region corresponding to the target image.

Alternatively, in other embodiments of the present disclosure, the first region may also be determined according to the feature points of each part of the target object. For example, if the target object is a face, the first region may be determined based on the feature points of the feature parts such as the nose, eyes, ears, and eyebrows.

Figure 2:
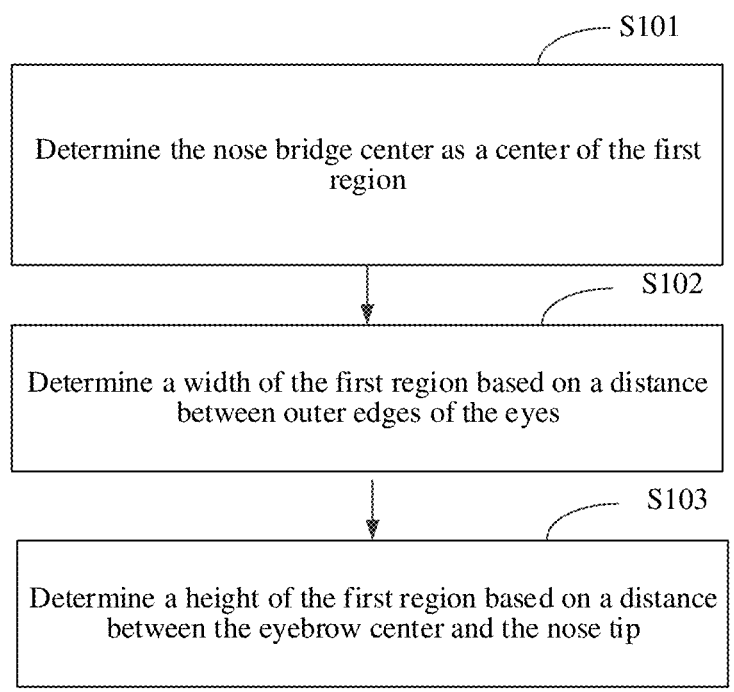
FIG. 2 illustrates a flowchart of determining a first region if a target object is a face in an image processing method according to embodiments of the present disclosure.

FIG. 2 illustrates a flowchart of determining a first region if a target object is a face in an image processing method according to embodiments of the present disclosure. Determining the first region based on the relative positions between the feature points may include:

S101, determining the nose bridge center as a center of the first region;

S102, determining a width of the first region based on a distance between outer edges of the eyes; and S103, determining a height of the first region based on a distance between the eyebrow center and the nose tip.

In the embodiments of the present disclosure, if the target object is a face, the positions of the feature parts such as the nose, eyes, ears, eyebrows, and mouth of the face may be determined according to a face recognition method, and then the first region determined based on these feature parts may be determined. The center position of the nose bridge may be determined as the center of the first region, that is, the first region in the implementation of the present disclosure is symmetrically provided with respect to the center position of the nose bridge. In addition, the width of the first region may be determined according to a first distance between the outer edge of the left eye and the outer edge of the right eye, where the first distance may be directly set as the width of the first region, and the width of the first region may also be determined according to a first preset correspondence relationship, for example, a preset multiple of the first distance may be used. The first preset correspondence relationship may be set according to different requirements in the art, which is not limited in the embodiments of the present disclosure. In addition, the height of the first region may be determined according to a second distance between the eyebrow center and the nose tip, where the eyebrow center refers to the center position between the two eyebrows. The first distance and the second distance may be calculated by means of face recognition. A person skilled in the art may select an appropriate algorithm to obtain the first distance and the second distance, for example, using a PCA algorithm to recognize the features. Correspondingly, a second preset correspondence relationship may exist between the height of the first mesh and the second distance. For example, the height of the first region may be twice the second distance. The second preset correspondence relationship may be set according to different requirements in the art, which is not limited in the embodiments of the present disclosure.

On the basis of the above, the height and width of the first region may be determined according to the recognized feature points, thereby determining the size of the first region, moreover, the first region corresponds to the position of the target object. After the size and position of the first region are determined, the first region may also be divided into a plurality of sub-meshes to form a first mesh, the plurality of sub-meshes may be the same, and in the embodiments of the present disclosure, the first region may be divided according to a preset dimension. A first dimension may be determined based on the size of the first mesh, or may be determined according to pre-configured dimension information.

For example, in the embodiments of the present disclosure, the first mesh is divided into sub-meshes of a preset dimension according to the size of the first mesh, where the size of the sub-mesh is less than a size threshold, that is, in the embodiments of the present disclosure, it is necessary to divide the first mesh into sub-meshes having a size less than the size threshold. In addition, the first mesh may also be divided according to pre-configured dimension information. The foregoing size threshold and pre-configured dimension information may be preset, and may be set by a person skilled in the art according to different requirements.

As described above, after the first region is determined, the deformed pixel matrix (deformation parameter) for performing the deformation operation may also be determined according to the preset deformation effect. The deformation parameter may be determined according to an image template with the preset deformation effect, or the deformation parameter may be determined according to the deformation operation on the first region.

Figure 3:
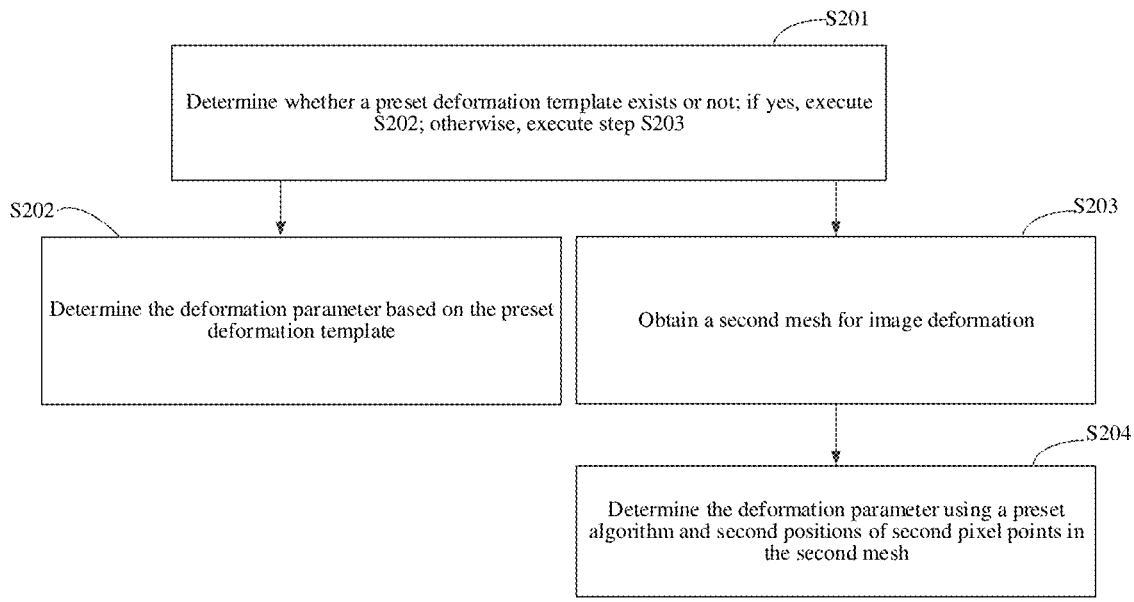
FIG. 3 illustrates a flowchart of step S200 in an image processing method according to embodiments of the present disclosure.

FIG. 3 illustrates a flowchart of step S200 in an image processing method according to embodiments of the present disclosure. Step S200 may include:

S201: determining whether a preset deformation template exists; if yes, executing S202; otherwise, executing step S203;

S202: determining the deformation parameter based on the preset deformation template;

S203: obtaining a second mesh for image deformation, the second mesh being a deformed mesh; and S204: determining the deformation parameter by using a preset algorithm and second positions of second pixel points in the second mesh.

In the embodiments of the present disclosure, whether a preset deformation template exists or not may be first determined, the preset deformation template being an image template having the preset deformation effect. Determining whether the preset deformation template exists or not may include:

determining whether selection information of a deformation image is received or not, if yes, determining that the preset deformation template exists, otherwise, the preset deformation template does not exist; or when a first instruction for performing a deformation operation based on the preset deformation image is received, determining that the preset deformation template exists. That is, the user may select an image of a desired deformation effect as an image template of a preset deformation effect, i.e., the foregoing preset deformation template.

If it is determined that the preset deformation template exists, the deformation parameter may be determined according to the deformation effect corresponding to the preset deformation template; and if the preset deformation template does not exist, a second mesh for image deformation is obtained, and the deformation parameter is determined based on the difference between the first mesh and the second mesh.

The second mesh may be obtained based on the user's direct deformation operation on the first mesh, or may be a mesh obtained by other approaches, such as by obtaining a stored second mesh. The two approaches are respectively described below in detail.

Figure 4:
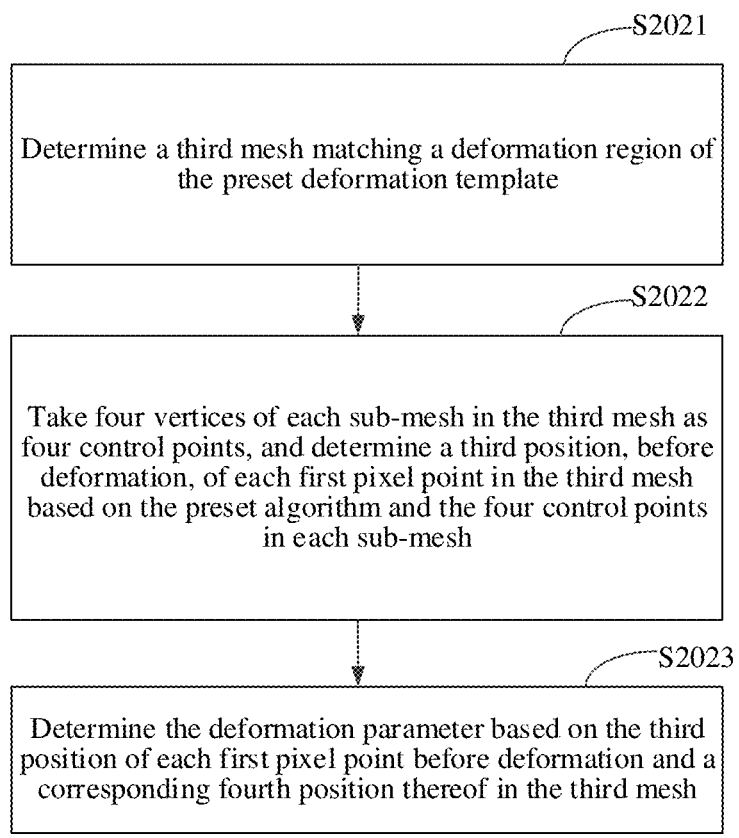
FIG. 4 illustrates a flowchart of determining a deformation parameter based on a preset deformation template in an image processing method according to embodiments of the present disclosure.

FIG. 4 illustrates a flowchart of determining a deformation parameter based on a preset deformation template in an image processing method according to embodiments of the present disclosure. Step S202 may include:

S2021: determining a third mesh matching a deformation region of the preset deformation template;

S2022: taking four vertices of each sub-mesh in the third mesh as four control points, and determining a third position, before deformation, of each first pixel point in the third mesh based on the preset algorithm and the four control points in each sub-mesh; and S2023: determining the deformation parameter based on the third position of each first pixel point before deformation and a corresponding fourth position thereof in the third mesh.

In the embodiments of the present disclosure, the preset deformation template may correspond to a deformation region where the deformation operation is performed, and the deformation region is equivalent to a region where the target object in the first image is located. When step S2021 is executed, a third mesh matching the deformation region of the preset deformation template may be obtained, where the third mesh may be a third mesh, after deformation, of the deformation region in the preset deformation template. The size and position of the third mesh match those of the deformation region.

After the third mesh is determined, the third position of each first pixel point in the third mesh when the deformation operation is not performed may be determined according to the four control points of each sub-mesh in the third mesh. The third position of each first pixel point before deformation may be obtained according to a preset algorithm. The preset algorithm may be a Bezier surface algorithm, which is expressed as:

$$p(u,v)=d\_1*u+d\_2*v+d\_3*u*v+d\_4 \qquad \text{Formula I}$$

where $d\_i$ is equal to $(a\_i, b\_i)$ and is determined by the coordinates of control points of each sub-mesh in the third mesh, and i is a positive integer less than 5; u and v are the horizontal coordinate and vertical coordinate of the third position, before deformation, of each first pixel point in the third mesh; and p(u, v) is coordinate values of the fourth position, after deformation, of each first pixel point in the third mesh. By means of the formula above, a correspondence relationship between the third position (u, v) of each first pixel point before deformation and the fourth position P(u, v) thereof after deformation may be established. In the case that the third mesh is known, the four control points of each sub-mesh in the third mesh and the third position of the corresponding first pixel point are known, for example, a Cartesian coordinate system may be established, so that the position of the third mesh in the Cartesian coordinate system and the position of each pixel point in the third mesh in the Cartesian coordinate system may be determined, and then the position of the first pixel point before deformation, i.e., the third position, may be obtained by the above approach.

$d\_1=b10-b00$; $d\_2=b01-b00$; $d\_3=b11+b00-b01-b10$; and $d\_4=b00$, where b00, b01, b10, and b11 are the coordinate values of the four control points located on the upper left, lower left, upper right, and lower right of a sub-mesh of the third mesh, respectively.

In this way, the third position, before deformation, of each pixel point in the third mesh may be obtained, so that the deformation parameter is determined according to the difference between the third position and the fourth position.

As described in the foregoing embodiments, the deformation parameter may include an initial position of each pixel point in the deformation region of the preset deformation template. Based on the difference between the current position of the pixel point and the initial position, the position deviation of the pixel point corresponding to the deformation effect may be determined. In addition, in other embodiments of the present disclosure, the parameter value in the deformation parameter may be the position deviation corresponding to the deformation operation of each pixel point. The position deviations in the embodiments of the present disclosure are all vector values, which include deviations in length and width directions.

Further, after the deformation parameter is obtained, the dimension of the deformation parameter may be adjusted according to the size of the first mesh, such as the dimension of the deformed pixel matrix, so that the pixel points in the deformed pixel matrix have one-to-one correspondence to the pixel points in the first mesh. That is, the deformation parameter obtained in step S2023 in the embodiments of the present disclosure may be a deformation parameter corresponding to the deformation region in the preset deformation template (hereinafter distinguished by a first pixel matrix). In order to achieve the same deformation effect as the preset deformation template, the deformation operation of the first image may be performed according to the first pixel matrix. In order to ensure that the size of the deformed pixel matrix of the first mesh matches the size of the first mesh, i.e., enabling pixel points of the first mesh in the length and width directions to have one-to-one correspondence to parameters of the pixel points of the deformed pixel matrix, the dimension of the first deformed pixel matrix needs to be adjusted according to the size of the first mesh.

The number of pixel points of the first mesh in the length and width directions may be determined, and the dimension of the first deformation template corresponding to the deformation region in the preset deformation template may be adjusted based on the number. For example, pixel points are sampled in the deformation region in a uniform sampling mode, where the number of samples is the same as the number of pixel points corresponding to the first mesh, so that the first pixel matrix to be subjected to dimension adjustment is determined based on the position deviations of the sampled pixel points, and the pixel points in the first pixel matrix have one-to-one correspondence to the pixel points in the first mesh, and the first pixel matrix subjected to dimension adjustment is the deformation parameter in the embodiments of the present disclosure.

In the foregoing embodiments, the deformation parameter is determined by means of the preset deformation template. The determination of the deformation parameter using the obtained second mesh is described below in detail.

In the embodiments of the present disclosure, the user may directly perform dragging or other deformation operations on the first region to change the shape of the first region, so as to determine the deformation parameter. The process may include:

receiving a touch operation on the first region;
correspondingly adjusting the shape of the first mesh according to the touch operation;
obtaining a position deviation, generated based on the touch operation, of each pixel point in the first region; and
determining the deformation parameter according to the position deviation.

In the embodiments of the present disclosure, the user may perform a touch operation on the first region to change the shape of the first region, and the position deviation of each pixel point generated based on the touch operation is determined according to the difference between the position of the pixel point after the shape is changed and the position thereof before the shape is changed, and the deformation parameter is established based on the position deviation.

Figure 5:
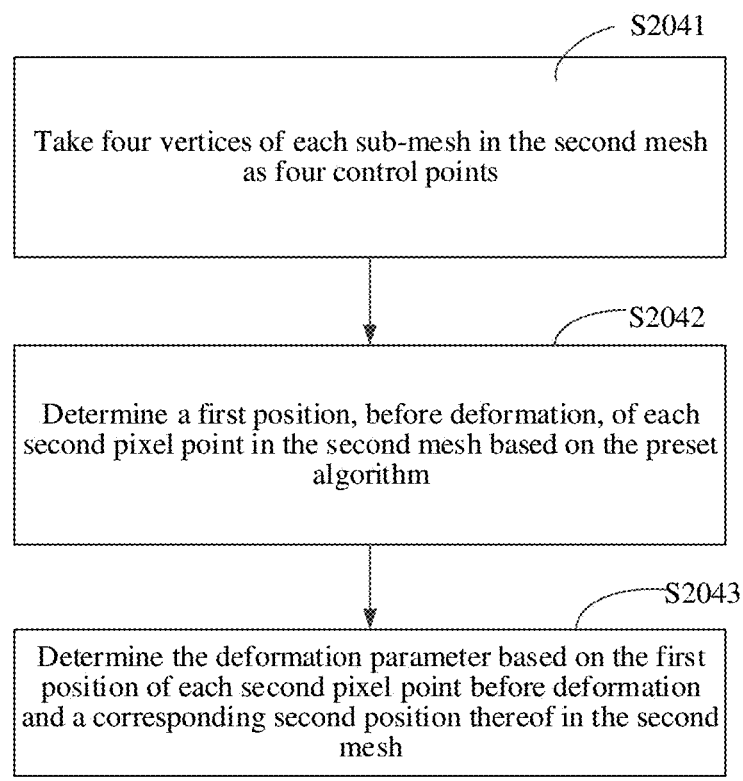
FIG. 5 illustrates a flowchart of step S204 in an image processing method according to embodiments of the present disclosure.

Alternatively, in the embodiments of the present disclosure, the deformation parameter may also be determined according to a directly obtained second mesh, where the second mesh is a deformed mesh. FIG. 5 illustrates a flowchart of step S204 in an image processing method according to embodiments of the present disclosure. Step S204 may include:

S2041: taking four vertices of each sub-mesh in the second mesh as four control points;

S2042: determining a first position, before deformation, of each second pixel point in the second mesh based on the preset algorithm; and S2043: determining the deformation parameter based on the first position of each second pixel point before deformation and a corresponding second position thereof in the second mesh.

In the same manner as the foregoing embodiments, the four vertices of each sub-mesh in the second mesh are taken as four control points, and then the first position of each second pixel point in the second mesh when the deformation operation is not performed may be determined. The first position of each second pixel point before deformation may be obtained according to a preset algorithm. The preset algorithm may be a Bezier surface algorithm, which is expressed as:

$$p(u, v) = d\_1*u + d\_2*v + d\_3*u*v + d\_4 \quad \text{Formula I}$$

where d_i is equal to (a_i, b_i) and is determined by the coordinates of control points of each sub-mesh in the second mesh, and i is a positive integer less than 5; u and v are the horizontal coordinate and vertical coordinate of the first position, before deformation, of each second pixel point in the second mesh; p(u, v) is coordinate values of the corresponding second position, after deformation, of each second pixel point in the second mesh. By means of the formula above, the correspondence relationship between the first position (u, v) of each second pixel point before deformation and the second position P(u, v) thereof after deformation may be established. In the case that the second mesh is known, the four control points of each sub-mesh in the second mesh and the second position of the corresponding second pixel point are known, for example, a Cartesian coordinate system may be established, so that the position of the second mesh in the Cartesian coordinate system and the position of each pixel point in the second mesh in the Cartesian coordinate system may be determined, and then the position of the second pixel point before deformation, i.e., the first position, may be obtained by the above approach.

d_1=b10−b00; d_2=b01−b00; d_3=b11+b00−b01−b10; and d_4=b00, where b00, b01, b10, and b11 are the coordinate values of the four control points located on the upper left, lower left, upper right, and lower right of the sub-mesh of the second mesh, respectively.

In the embodiments of the present disclosure, the sub-mesh based deformation algorithm may change the shape of the mesh by pulling the vertices of the mesh, and then reflect the deformation of the mesh on the image to achieve free deformation of the image. For the existing control point deformation algorithms (such as TPS, MLS and MRLS), the more the control points is, the higher the complexity of the algorithm is, and the worse the real-time effect on the image deformation is. When such algorithms are applied to the mesh structure to deform the image, discontinuous edges may also occur. The number of control points in the functions applied by the Bezier surface algorithm used in the embodiments of the present disclosure is small, a good mesh deformation effect may be achieved, and by optimizing the Bezier surface algorithm, the complexity is reduced and the real-time performance is improved. The efficiency of the calculation algorithm in the embodiments of the present disclosure is verified by a processor of an electronic device, and for face deformation performed on a 720p image, a forward calculation Bezier surface algorithm takes a total of about 40-50 ms, and the algorithm in the embodiments of the present disclosure takes about 8 ms to perform face deformation on the same image. In addition, by using an inverse operation of the Bezier surface formula, the deformed pixel matrix may also be directly obtained, which further improves the deformation speed.

In this way, the first position, before deformation, of each pixel point in the second mesh may be obtained, so that the deformation parameter is determined according to the difference between the first position and the second position.

As described in the foregoing embodiments, the deformation parameter may include an initial position of each second pixel point in the second mesh of the preset deformation template. Based on the difference between the current position of the second pixel point and the initial position thereof, the position deviation of each pixel point corresponding to the deformation effect may be determined. In addition, in other embodiments of the present disclosure, the parameter value in the deformation parameter may be the position deviation corresponding to the deformation operation of each pixel point. The position deviations in the embodiments of the present disclosure are all vector values, which include deviations in length and width directions.

That is, the second mesh in the embodiments of the present disclosure may also correspond to the position deviation of each pixel point generated when performing deformation. In this case, the position deviation of each pixel point based on the touch operation may be determined according to the difference between the position of the pixel point after the shape is changed and the position thereof before the shape is changed, and the deformation parameter is established based on the position deviation. The second mesh may be a mesh that matches or does not match the first mesh in size. When the size of the second mesh does not match the first mesh, the size of the second mesh may be changed, and the deformation effect of the second mesh is retained. For example, a mesh that matches the first mesh in size may be obtained based on the second mesh by means of uniform sampling. In other embodiments, the first mesh and the second mesh may also be matched in other ways, which is not limited in the embodiments of the present disclosure.

Alternatively, the dimension of the deformation parameter may be adjusted according to the size of the first mesh, so that the pixel points in the deformation parameter have one-to-one correspondence to the pixel points in the first mesh. That is, the deformation parameter obtained in step S2023 in the embodiments of the present disclosure may be the deformation parameter corresponding to the deformation region in the preset deformation template (hereinafter distinguished by the first pixel matrix). In order to achieve the same deformation effect as the preset deformation template, the deformation operation of the first image may be performed according to the first pixel matrix. In order to ensure that the deformation parameter of the first mesh matches the size of the first mesh, i.e., enabling the pixel points of the first mesh in the length and width directions to have one-to-one correspondence to parameters of the pixel points in the deformation parameter, the dimension of the first deformed pixel matrix needs to be adjusted according to the size of the first mesh.

By means of the aforementioned configuration, the deformation parameter corresponding to the deformation effect may be obtained, so that the deformation operation of the first image may be performed according to the deformation parameter.

In the embodiments of the present disclosure, performing deformation processing on the target object in the first image based on the deformation parameter to obtain the second image may include:

adjusting the position of the corresponding pixel point on the target object using a linear interpolation algorithm based on the position deviation of each pixel point in the deformation parameter; and determining a gray-scale value of the pixel point after the position adjustment as a gray-scale value of the pixel point before the position adjustment. In the case that a pixel point on the target object is adjusted from the original position to a new position based on the position deviation, the pixel value of the pixel point at the new position is replaced with the pixel value of the pixel point at the original position. That is, when position processing is performed on the pixel point, and the pixel point is adjusted from the original position to the new position, the pixel value of the pixel point at the original position may be retained at the new position, thereby achieving the deformation processing of the target object. The pixel value may be expressed as a gray-scale value, but it is not a specific limitation of the present disclosure.

Figure 7:
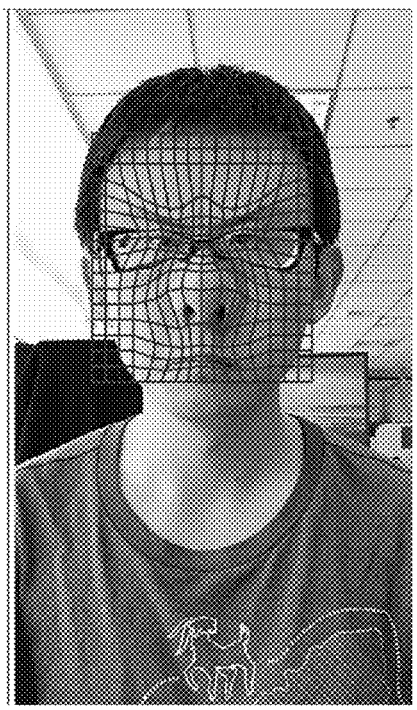
FIG. 7 is a structural schematic diagram of performing deformation processing based on a deformation parameter according to embodiments of the present disclosure.
Figure 8:
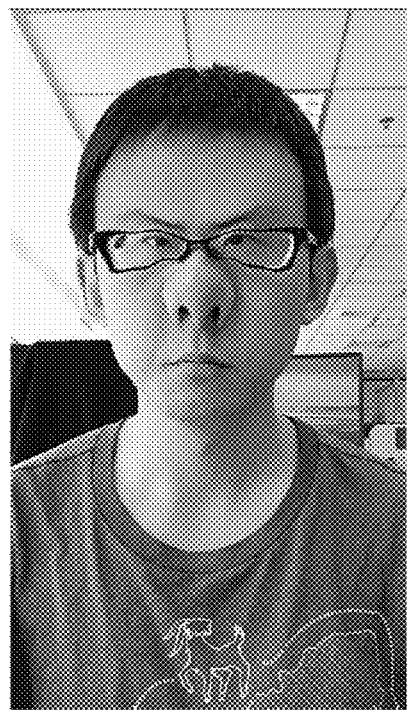
FIG. 8 illustrates a schematic diagram of an obtained second image according to embodiments of the present disclosure.

The linear interpolation algorithm as described in the foregoing embodiments may be a bilinear interpolation algorithm, and the pixel value of each pixel point may be quickly obtained by means of the algorithm. FIG. 7 is a structural schematic diagram of performing deformation processing based on a deformation parameter according to embodiments of the present disclosure, and FIG. 8 illustrates a schematic diagram of an obtained second image according to embodiments of the present disclosure. In the embodiments of the present disclosure, deformation processing of an image may be easily and quickly performed.

In conclusion, according to the embodiments of the present disclosure, deformation processing may be directly performed on an image according to the desired deformation effect, rather than simply performing the deformation operation by dragging or adding pictures and tags. According to the embodiments of the present disclosure, image deformation is performed more conveniently and flexibly, and the applicability is better. In addition, image deformation controlled by control points in the mesh deformation algorithm may be optimized according to the Bezier surface algorithm, and the complexity of the image deformation algorithm controlled by control points after optimization is greatly reduced, so as to adapt to other image processing algorithms requiring free deformation except face entertainment deformation, and the complexity of image deformation processing may also be reduced using mesh deformation. In addition, the embodiments of the present disclosure may achieve rich face deformation effects by combining meshes and face keypoints, have good deformation results for face images having different corners and different sizes, and have a stable performance in the processing of face deformations in videos.

It can be understood that the foregoing method embodiments mentioned in the present disclosure may be combined with each other to form combined embodiments without departing from the principle logic. Details are not described herein repeatedly due to space limitation.

In addition, the present disclosure further provides an image processing apparatus, an electronic device, a computer-readable storage medium, and a program, which may all be configured to implement any one of the image processing methods provided in the present disclosure. For corresponding technical solutions and descriptions, please refer to the corresponding content in the method section. Details are not described repeatedly.

The embodiments of the present disclosure further provide a computer-readable storage medium, having computer program instructions stored thereon, where when the computer program instructions are executed by a processor, the foregoing method is implemented. The computer-readable storage medium may be a nonvolatile computer-readable storage medium or a volatile computer-readable storage medium.

The embodiments of the present disclosure further provide an electronic device, including: a processor; and a memory configured to store processor-executable instructions, where the processor is configured to execute the foregoing method.

The electronic device may be provided as a terminal, a server, or other forms of devices.

Figure 9:
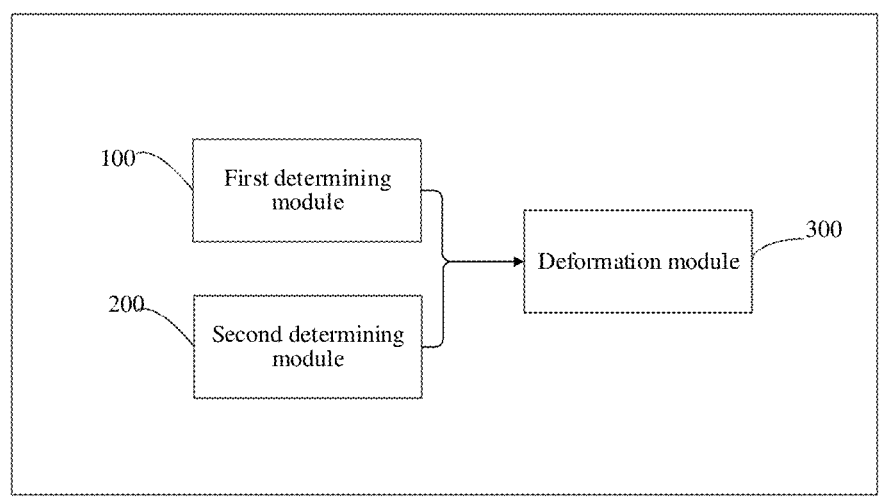
FIG. 9 illustrates a block diagram of an image processing apparatus according to embodiments of the present disclosure.

FIG. 9 illustrates a block diagram of an image processing apparatus according to embodiments of the present disclosure. The apparatus may include:

a first determining module 100, configured to determine a first region matching a target object in a first image;

a second determining module 200, configured to determine a deformation parameter based on a preset deformation effect, the deformation parameter being used for determining a position deviation, generated based on the preset deformation effect, for each pixel point of the target object; and a deformation module 300, configured to perform deformation processing on the target object in the first image based on the deformation parameter to obtain a second image.

In the embodiments of the present disclosure, the first determining module is further configured to determine the first region by forming a first mesh corresponding to the target object, the first mesh matching the first region.

In the embodiments of the present disclosure, the deformation parameter is a deformed pixel matrix, and each parameter in the deformed pixel matrix is used for determining a position deviation, generated based on the preset deformation effect, of a corresponding pixel point of the target object.

In the embodiments of the present disclosure, the first determining module is further configured to determine positions of feature points of the target object in the first image; and determine the first region based on relative positions between the feature points.

In the embodiments of the present disclosure, the second determining module is further configured to determine whether a preset deformation template exists; and in response to determining that the preset deformation template exists, determine the deformation parameter based on the preset deformation template by using a preset algorithm.

In the embodiments of the present disclosure, the second determining module is further configured to obtain, in response to determining that the preset deformation template does not exist, a second mesh for image deformation; and determine the deformation parameter by using a preset algorithm and second positions of second pixel points in the second mesh, where the second mesh is a deformed mesh.

In the embodiments of the present disclosure, the second determining module is further configured to determine, when a first instruction for performing a deformation operation based on a preset deformation image is received, that the preset deformation template exists.

In the embodiments of the present disclosure, the second determining module is further configured to determine a third mesh matching a deformation region of the preset deformation template;

take four vertices of each sub-mesh in the third mesh as four control points, and determine a third position, before deformation, of each first pixel point in the third mesh based on the preset algorithm and the four control points in each sub-mesh; and determine the deformation parameter based on the third position of each first pixel point before deformation and a corresponding fourth position thereof in the third mesh.

In the embodiments of the present disclosure, the second determining module is further configured to take four vertices of each sub-mesh in the second mesh as four control points;

determine a first position, before deformation, of each second pixel point in the second mesh based on the preset algorithm; and determine the deformation parameter based on the first position of each second pixel point before deformation and a corresponding second position thereof in the second mesh.

In the embodiments of the present disclosure, the expression of the preset algorithm is:

$$p(u, v)=d\_1*u+d\_2*v+d\_3*u*v+d\_4 \qquad \text{Formula I}$$

where d_i is equal to (a_i, b_i) and is determined by the coordinates of control points of each sub-mesh in the deformed mesh, and i is a positive integer less than 5; u and v are the horizontal coordinate and vertical coordinate of the position, before deformation, of each pixel point in the deformed mesh; p(u, v) is the position coordinates, after deformation, of each pixel point in the deformed mesh; and the deformed mesh is the second mesh or the third mesh.

In the embodiments of the present disclosure, the second determining module is further configured to receive a deformation operation on the first region, and obtain the second mesh based on the deformation operation; or obtain a stored second mesh.

In the embodiments of the present disclosure, the second determining module is further configured to adjust the dimension of the deformed pixel matrix based on the number of pixel points of the first region in a length direction and the number of pixel points thereof in a width direction to obtain a deformed pixel matrix subjected to dimension adjustment, so that pixel points in the deformed pixel matrix have one-to-one correspondence to pixel points in the first region; and the deformation module is further configured to obtain the second image using the deformed pixel matrix subjected to dimension adjustment.

In the embodiments of the present disclosure, the deformation module is further configured to adjust the position of the corresponding pixel point on the target object using a linear interpolation algorithm based on the position deviation of each pixel point in the deformation parameter.

In the embodiments of the present disclosure, the first determining module is further configured to determine, when the target object includes a face, the nose bridge center as a center of the first region;

determine a width of the first region based on a distance between outer edges of the eyes; and determine a height of the first region based on a distance between the eyebrow center and the nose tip.

In the embodiments of the present disclosure, the first determining module is further configured to determine the first mesh matching the position and size of the target object in the first image, the first mesh being equally divided into a plurality of sub-meshes.

In conclusion, according to the embodiments of the present disclosure, deformation processing may be directly performed on an image according to the desired deformation effect, rather than simply performing a deformation operation by dragging or adding pictures and tags. According to the embodiments of the present disclosure, image deformation is performed more conveniently and flexibly, and the applicability is better. In addition, image deformation controlled by control points in the mesh deformation algorithm may be optimized according to the Bezier surface algorithm, and the complexity of the image deformation algorithm controlled by control points after optimization is greatly reduced, so as to adapt to other image processing algorithms requiring free deformation except face entertainment deformation, and the complexity of image deformation processing may also be reduced using mesh deformation. In addition, the embodiments of the present disclosure may achieve rich face deformation effects by combining meshes and face keypoints, have good deformation results for face images having different corners and different sizes, and have a stable performance in the processing of face deformations in videos.

Figure 10:
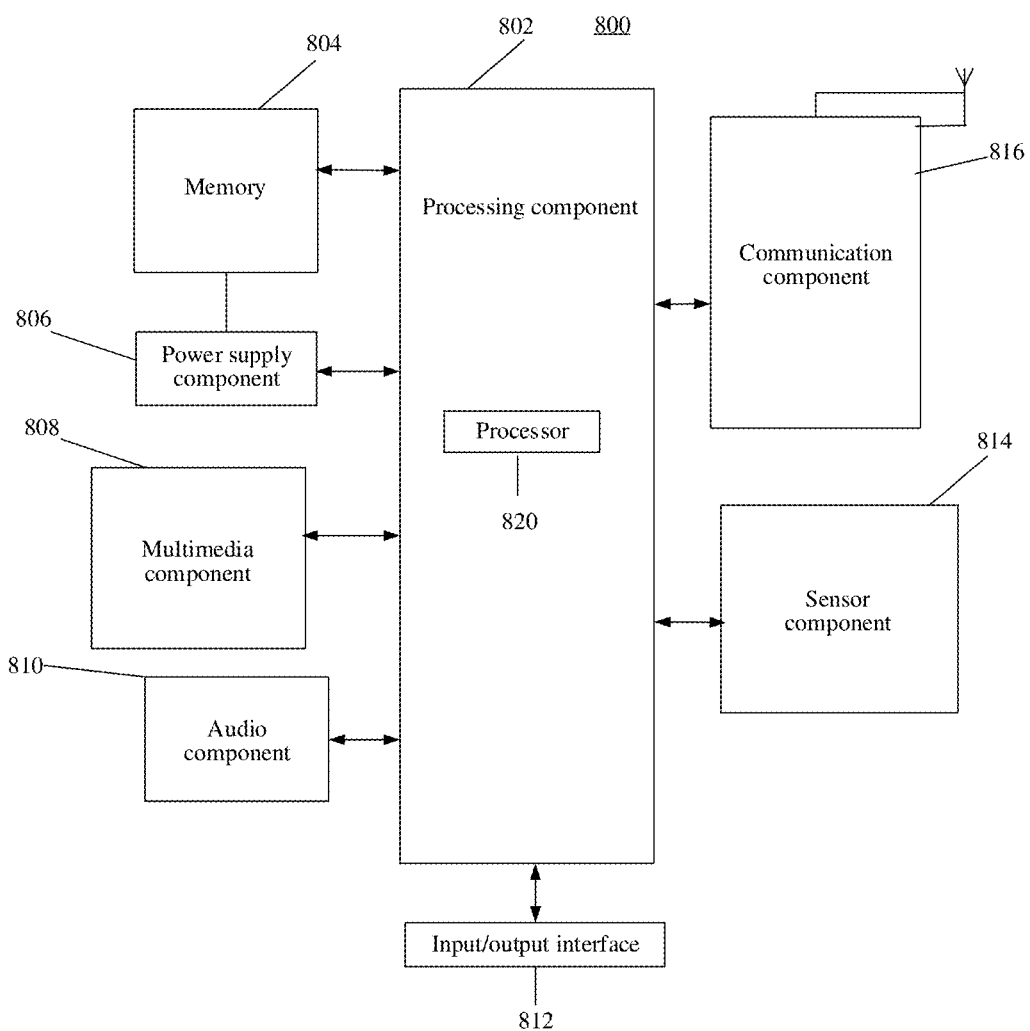
FIG. 10 illustrates a block diagram of an electronic device according to embodiments of the present disclosure.

FIG. 10 illustrates a block diagram of an electronic device according to embodiments of the present disclosure. The electronic device may be provided as a terminal, a server, or other forms of devices. The electronic device may include an image processing apparatus 800. For example, the apparatus 800 may be a terminal such as a mobile phone, a computer, a digital broadcast terminal, a message transceiver device, a game console, a tablet device, a medical device, exercise equipment, and a personal digital assistant.

Referring to FIG. 10, the apparatus 800 includes one or more of the following components: a processing component 802, a memory 804, a power supply component 806, a multimedia component 808, an audio component 810, an Input/Output (I/O) interface 812, a sensor component 814, and a communication component 816.

The processing component 802 generally controls overall operation of the apparatus 800, such as operations associated with display, phone calls, data communications, camera operations, and recording operations. The processing component 802 may include one or more processors 820 to execute instructions to implement all or some of the steps of the method above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the apparatus 800. Examples of the data include instructions for any application or method operated on the apparatus 800, contact data, contact list data, messages, pictures, videos, and the like. The memory 804 is implemented by any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disc.

The power supply component 806 provides power for various components of the apparatus 800. The power supply component 806 may include a power management system, one or more power supplies, and other components associated with power generation, management, and distribution for the apparatus 800.

The multimedia component 808 includes a screen between the apparatus 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the apparatus 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the apparatus 800 is in an operation mode, such as a calling mode, a recording mode, and a voice recognition mode. The received audio signal may be further stored in the memory 804 or sent by means of the communication component 816. In some embodiments, the audio component 810 further includes a speaker for outputting an audio signal.

The I/O interface 812 provides an interface between the processing component 802 and a peripheral interface module, and the peripheral interface module is a keyboard, a click wheel, a button, or the like. The button may include, but is not limited to, a home button, a volume button, a start button, and a lock button.

The sensor component 814 includes one or more sensors for providing state assessment in various aspects for the apparatus 800. For example, the sensor component 814 may detect an on/off state of the apparatus 800, and relative positioning of components, which are the display and keypad of the apparatus 800, for example, and the sensor component 814 may further detect a location change of the apparatus 800 or a component of the apparatus 800, the presence or absence of contact of the user with the apparatus 800, the orientation or acceleration/deceleration of the apparatus 800, and a temperature change of the apparatus 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the apparatus 800 and other devices. The apparatus 800 may access a wireless network based on a communication standard, such as Wi-Fi, 2G, or 3G, or a combination thereof. In one exemplary embodiment, the communication component 816 receives a broadcast signal or broadcast-related information from an external broadcast management system by means of a broadcast channel. In one exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the apparatus 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above.

In exemplary embodiments, also provided is a nonvolatile computer-readable storage medium having computer program instructions stored thereon, where when the computer program instructions are executed by a processor, the image processing method described in the foregoing embodiments is implemented, e.g., a memory 804 including computer program instructions, which can be executed by the processor 820 of the apparatus 800 to complete the foregoing method.

Figure 11:
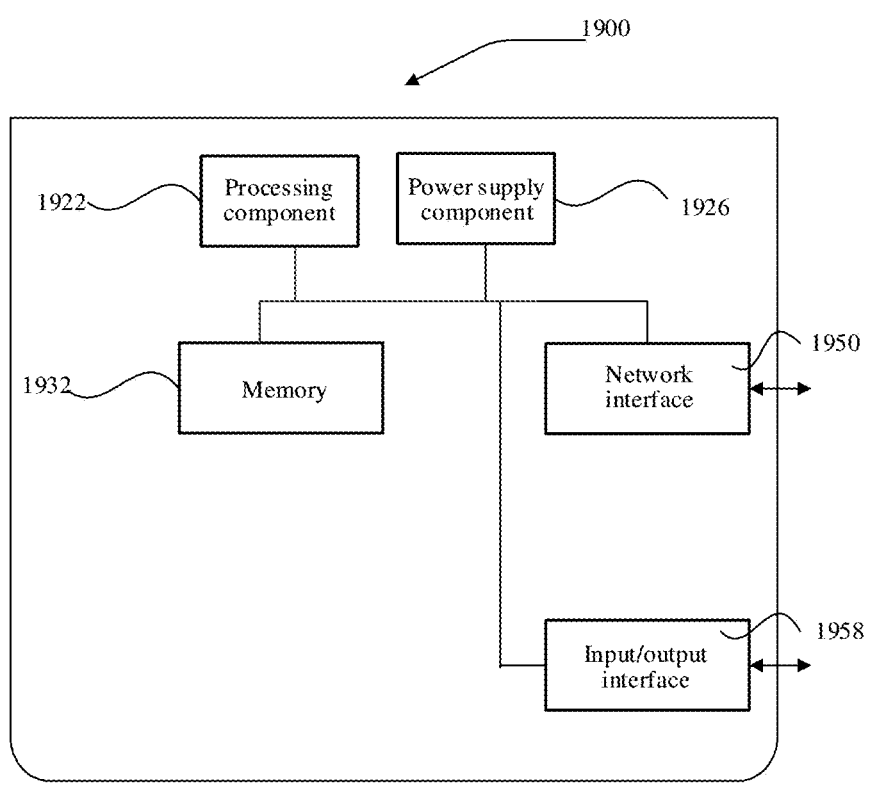
FIG. 11 illustrates a block diagram of another electronic device according to embodiments of the present disclosure.

FIG. 11 illustrates a block diagram of another electronic device according to embodiments of the present disclosure. For example, the electronic device 1900 may be provided as a server. With reference to FIG. 11, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. In addition, the processing component 1922 is configured to execute instructions so as to execute the method above.

The electronic device 1900 may further include a power supply component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as Windows Server™, Mac OS X™, Unix™, Linux™, FreeBSD™ or the like.

In an exemplary embodiment, further provided is a non-volatile computer-readable storage medium, for example, a memory 1932 including computer program instructions, which can be executed by the processing component 1922 of the electronic device 1900 to implement the method above.

The present disclosure may be a system, a method, and/or a computer program product. The computer program product may include a computer-readable storage medium, on which computer-readable program instructions used by the processor to implement various aspects of the present disclosure are stored.

The computer-readable storage medium may be a tangible device that can maintain and store instructions used by an instruction execution device. The computer-readable storage medium may be, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include a portable computer disk, a hard disk, a Random Access Memory (RAM), an ROM, an EPROM (or a flash memory), an SRAM, a portable Compact Disc Read-Only Memory (CD-ROM), a Digital Versatile Disk (DVD), a memory stick, a floppy disk, a mechanical coding device such as a punched card storing an instruction or a protrusion structure in a groove, and any appropriate combination thereof. The computer-readable storage medium used here is not interpreted as an instantaneous signal such as a radio wave or other freely propagated electromagnetic wave, an electromagnetic wave propagated by a waveguide or other transmission media (for example, an optical pulse transmitted by an optical fiber cable), or an electrical signal transmitted by a wire.

The computer-readable program instruction described here is downloaded to each computing/processing device from the computer-readable storage medium, or downloaded to an external computer or an external storage device via a network, such as the Internet, a Local Area Network (LAN), a Wide Area Network (WAN), and/or a wireless network. The network may include a copper transmission cable, optical fiber transmission, wireless transmission, a router, a firewall, a switch, a gateway computer, and/or an edge server. A network adapter card or a network interface in each computing/processing device receives the computer-readable program instruction from the network, and forwards the computer-readable program instruction, so that the computer-readable program instruction is stored in a computer-readable storage medium in each computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions can be completely executed on a user computer, partially executed on a user computer, executed as an independent software package, executed partially on a user computer and partially on a remote computer, or completely executed on a remote computer or a server. In the case of a remote computer, the remote computer may be connected to a user computer via any type of network, including an LAN or a WAN, or may be connected to an external computer (for example, connected via the Internet with the aid of an Internet service provider). In some embodiments, an electronic circuit such as a programmable logic circuit, a Field Programmable Gate Array (FPGA), or a Programmable Logic Array (PLA) is personalized by using status information of the computer-readable program instructions, and the electronic circuit can execute the computer-readable program instructions to implement various aspects of the present disclosure.

Various aspects of the present disclosure are described here with reference to the flowcharts and/or block diagrams of the methods, apparatuses (systems), and computer program products according to the embodiments of the present disclosure. It should be understood that each block in the flowcharts and/or block diagrams and a combination of the blocks in the flowcharts and/or block diagrams can be implemented with the computer-readable program instructions.

These computer-readable program instructions may be provided for a general-purpose computer, a dedicated computer, or a processor of other programmable data processing apparatus to generate a machine, so that when the instructions are executed by the computer or the processors of other programmable data processing apparatuses, an apparatus for implementing a specified function/action in one or more blocks in the flowcharts and/or block diagrams is generated. These computer-readable program instructions may also be stored in a computer-readable storage medium, and these instructions instruct a computer, a programmable data processing apparatus, and/or other devices to work in a specific manner. Therefore, the computer-readable storage medium having the instructions stored thereon includes a manufacture, and the manufacture includes instructions in various aspects for implementing the specified function/action in the one or more blocks in the flowcharts and/or block diagrams.

The computer-readable program instructions may also be loaded onto a computer, other programmable data processing apparatuses, or other devices, so that a series of operation steps are executed on the computer, the other programmable apparatuses, or the other devices, thereby generating a computer-implemented process. Therefore, the instructions executed on the computer, the other programmable apparatuses, or the other devices implement the specified function/action in the one or more blocks in the flowcharts and/or block diagrams.

The flowcharts and block diagrams in the accompanying drawings show architectures, functions, and operations that may be implemented by the systems, methods, and computer program products in multiple embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, the functions noted in the block may also occur out of the order noted in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system configured to execute specified functions or actions, or may be implemented by using a combination of dedicated hardware and computer instructions.

The embodiments of the present disclosure are described above. The foregoing descriptions are exemplary but not exhaustive, and are not limited to the disclosed embodiments. Many modifications and variations will be apparent to a person of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

The invention claimed is:

1. An image processing method, comprising:
   determining a first region matching a target object in a first image, wherein the first region is determined based on relative positions between feature points of the target object;
   determining a deformation parameter based on a preset deformation effect, the deformation parameter being used for determining a position deviation, generated based on the preset deformation effect, for each pixel point of the target object, wherein the preset deformation effect includes an image template with the preset deformation effect, or the preset deformation effect is obtained according to a deformation operation on the first region; and
   performing deformation processing on the target object in the first image based on the deformation parameter to obtain a second image,
   wherein determining the deformation parameter based on the preset deformation effect comprises:
      determining whether a preset deformation template exists;
      in response to determining that the preset deformation template exists, determining the deformation parameter based on the preset deformation template by using a preset algorithm; and
      in response to determining that the preset deformation template does not exist, obtaining a second mesh for image deformation, the second mesh being a deformed mesh, and determining the deformation parameter by using the preset algorithm and second positions of second pixel points in the second mesh, the second positions being positions after deformation of the second pixel points in the second mesh.

2. The method according to claim 1, wherein determining the first region matching the target object in the first image comprises:
   forming a first mesh corresponding to the target object, the first mesh matching the first region.

3. The method according to claim 1, wherein the deformation parameter is a deformed pixel matrix, and each parameter in the deformed pixel matrix is used for determining a position deviation, generated based on the preset deformation effect, for a corresponding pixel point of the target object.

4. The method according to claim 1, wherein determining the first region matching the target object in the first image comprises:
   determining positions of the feature points of the target object in the first image.

5. The method according to claim 1, wherein determining whether the preset deformation template exists comprises:
   when a first instruction for performing the deformation operation based on a preset deformation image is received, determining that the preset deformation template exists.

6. The method according to claim 1, wherein determining the deformation parameter based on the preset deformation effect further comprises:
   determining a third mesh matching a deformation region of the preset deformation template;
   taking four vertices of each sub-mesh in the third mesh as four control points, and determining a third position of each first pixel point in the third mesh before deformation based on the preset algorithm and the four control points in each sub-mesh; and
   determining the deformation parameter based on the third position of each first pixel point before deformation and a fourth position corresponding to the first pixel point in the third mesh.

7. The method according to claim 1, wherein determining the deformation parameter by using the preset algorithm and the second positions of the second pixel points in the second mesh comprises:
   taking four vertices of each sub-mesh in the second mesh as four control points;

determining a first position of each second pixel point in the second mesh before deformation based on the preset algorithm; and determining the deformation parameter based on the first position of each second pixel point before deformation and a second position corresponding to the second pixel point in the second mesh.

8. The method according to claim 1, wherein obtaining the second mesh for image deformation comprises:

receiving the deformation operation on the first region and obtaining the second mesh based on the deformation operation; or obtaining a stored second mesh.

9. The method according to claim 3, further comprising:

adjusting dimension of the deformed pixel matrix based on a number of pixel points in a length direction and a number of pixel points in a width direction for the first region to obtain a deformed pixel matrix subjected to dimension adjustment, so that pixel points in the deformed pixel matrix subjected to dimension adjustment have one-to-one correspondence to pixel points in the first region, and obtaining the second image by using the deformed pixel matrix subjected to dimension adjustment.

10. The method according to claim 1, wherein performing deformation processing on the target object in the first image based on the deformation parameter to obtain the second image comprises:

adjusting a position of a corresponding pixel point on the target object based on the position deviation of each pixel point in the deformation parameter by using a linear interpolation algorithm.

11. The method according to claim 1, wherein the target object comprises a face, and wherein a determining process of the first region based on the relative positions between the feature points comprises:

determining a nose bridge center as a center of the first region;

determining a width of the first region based on a distance between outer edges of eyes; and determining a height of the first region based on a distance between an eyebrow center and a nose tip.

12. The method according to claim 2, wherein forming the first mesh corresponding to the target object comprises:

determining the first mesh matching a position and size of the target object in the first image, the first mesh being equally divided into a plurality of sub-meshes.

13. An image processing apparatus, comprising:

a processor; and a memory configured to store instructions executable by the processor;

wherein the processor is configured to:

determine a first region matching a target object in a first image, wherein the first region is determined based on relative positions between feature points of the target object;

determine a deformation parameter based on a preset deformation effect, the deformation parameter being used for determining a position deviation, generated based on the preset deformation effect, for each pixel point of the target object, wherein the preset deformation effect includes an image template with the preset deformation effect, or the preset deformation effect is obtained according to a deformation operation on the first region; and perform deformation processing on the target object in the first image based on the deformation parameter to obtain a second image, wherein the processor is further configured to:

determine whether a preset deformation template exists;

in response to determining that the preset deformation template exists, determine the deformation parameter based on the preset deformation template by using a preset algorithm, and in response to determining that the preset deformation template does not exist, obtain a second mesh for image deformation, the second mesh being a deformed mesh, and determine the deformation parameter by using the preset algorithm and second positions of second pixel points in the second mesh, the second positions being positions after deformation of the second pixel points in the second mesh.

14. The apparatus according to claim 13, wherein the processor is further configured to determine the first region by forming a first mesh corresponding to the target object, the first mesh matching the first region.

15. The apparatus according to claim 13, wherein the deformation parameter is a deformed pixel matrix, and each parameter in the deformed pixel matrix is used for determining a position deviation, generated based on the preset deformation effect, for a corresponding pixel point of the target object.

16. The apparatus according to claim 13, wherein the processor is further configured to determine positions of the feature points of the target object in the first image.

17. A non-transitory computer-readable storage medium having computer program instructions stored thereon, wherein the computer program instructions, when being executed by a processor, implement an image processing method, comprising:

determining a first region matching a target object in a first image, wherein the first region is determined based on relative positions between feature points of the target object;

determining a deformation parameter based on a preset deformation effect, the deformation parameter being used for determining a position deviation, generated based on the preset deformation effect, for each pixel point of the target object, wherein the preset deformation effect includes an image template with the preset deformation effect, or the preset deformation effect is obtained according to a deformation operation on the first region; and performing deformation processing on the target object in the first image based on the deformation parameter to obtain a second image, wherein determining the deformation parameter based on the preset deformation effect comprises:

determining whether a preset deformation template exists;

in response to determining that the preset deformation template exists, determining the deformation parameter based on the preset deformation template by using a preset algorithm, and in response to determining that the preset deformation template does not exist, obtaining a second mesh for image deformation, the second mesh being a deformed mesh, and determining the deformation parameter by using the preset algorithm and second positions of second pixel points in the second mesh, the second positions being positions after deformation of the second pixel points in the second mesh.

* * * * *